US006905755B1

(12) United States Patent
Nemeth

(10) Patent No.: US 6,905,755 B1
(45) Date of Patent: Jun. 14, 2005

(54) SECURITY DOCUMENT WITH RAISED INTAGLIO PRINTED IMAGE

(75) Inventor: Joshua Robert Nemeth, Heathmont (AU)

(73) Assignee: Note Printing Australia Limited, Victoria (AU)

( * ) Notice: Subject to any disclaimer, the term of this patent is extended or adjusted under 35 U.S.C. 154(b) by 0 days.

(21) Appl. No.: 09/857,133

(22) PCT Filed: Jul. 5, 2000

(86) PCT No.: PCT/AU00/00810

§ 371 (c)(1), (2), (4) Date: May 31, 2001

(87) PCT Pub. No.: WO01/03951

PCT Pub. Date: Jan. 18, 2001

(30) Foreign Application Priority Data

Jul. 7, 1999 (AU) ............................................. PQ1461

(51) Int. Cl.$^7$ ................................................ B32B 27/14

(52) U.S. Cl. ................. 428/195.1; 428/916; 101/93.01; 101/400; 101/492; 427/256; 283/57; 283/67; 283/72; 359/2; 106/400

(58) Field of Search ........................ 427/256; 101/93.01, 101/400, 492; 283/57, 67, 72; 359/2; 428/195.1, 916, 195; 106/400

(56) References Cited

U.S. PATENT DOCUMENTS

| | | | | | |
|---|---|---|---|---|---|
| 4,033,059 | A | * | 7/1977 | Hutton et al. | 283/91 |
| 5,449,200 | A | * | 9/1995 | Andric et al. | 283/67 |
| 5,762,379 | A | | 6/1998 | Salmon et al. | |
| 5,766,738 | A | * | 6/1998 | Phillips et al. | 428/200 |
| 5,964,936 | A | * | 10/1999 | Reisser | 106/404 |
| 6,098,546 | A | * | 8/2000 | Schell | 101/492 |
| 6,294,267 | B1 | * | 9/2001 | Benoit | 428/515 |
| 6,505,779 | B1 | * | 1/2003 | Power et al. | 235/488 |

FOREIGN PATENT DOCUMENTS

| | | |
|---|---|---|
| GB | 2 063 775 | 6/1981 |
| JP | 07057545 A | 3/1995 |
| WO | WO 90/02658 A1 | 3/1990 |
| WO | WO 98/33658 | 8/1998 |
| WO | WO 98/53999 A | 12/1998 |

* cited by examiner

*Primary Examiner*—Rena Dye
*Assistant Examiner*—Tamra L. Dicus
(74) *Attorney, Agent, or Firm*—Christensen O'Connor Johnson Kindness PLLC

(57) ABSTRACT

A security document or other device including a substrate (2), a smooth highly reflective layer (1) applied thereto and having a reflectivity of at least 60 gloss units, and a raised printed image (3) applied to said reflective layer by a printing process such as the gravure process, the raised printed image having a height of at least 10 microns and being printed using a translucent ink having a large value of 85 to 95 as measured on an XL 211 Hazegard haze measuring instrument, which render it substantially transparent or translucent while causing scattering of the light reflectance and transmittance in at least a partially specular manner. A method of producing a document is also disclosed.

71 Claims, 2 Drawing Sheets

SECURITY DOCUMENT WITH RAISED INTAGLIO PRINTED IMAGE

This is a United States national stage application of International application No. PCT/AU00/00810, filed Jul. 5, 2000, the benefit of the filing date of which is hereby claimed under 35 U.S.C. § 120, which in turn claims the benefit of Australian application No. PQ 1461, filed Jul. 7, 1999, the benefit of the filing date of which is hereby claimed under 35 U.S.C. § 119.

FIELD OF THE INVENTION

This invention relates to security documents such as passport, bonds, banknotes, and security devices such as security passes and the like.

BACKGROUND OF THE INVENTION

Optically variable devices embedded in security documents are used to provide a high level of security whilst also providing an aesthetically pleasing effect.

Printed matter always has the problem of being copied or simulated by photocopying or scanning devices as well as simple printing techniques widely available in the commercial world. Therefore, devices that change colour or shape under various lighting conditions and or geometry make the task of counterfeiting or simulating the document much more difficult.

The introduction of the polymer security substrate has offered the perfect medium to produce secure devices in a cost effective and secure manner. As most high level security documents are already printed via the intaglio process, a well known method of printing which uses elevated temperatures and high pressures, 70°–90° C. at 25–30 Mpa, the machines and special inks for this process are only sold to bona fide security printers which offers a degree of inherent security.

In International Patent Application PCT/AU98/00046, a printed security document or device is described as including a reflective or brightly coloured base layer and a raised printed image applied to that layer by a printing process, at least part of the raised printed image having a height of at least 5 $\mu$m, the image being enhanced by the reflective or brightly coloured layer when viewed at different angles under different lighting conditions. Subsequent research on the effect created by this arrangement has revealed that it is important for best results for the base layer to be highly reflective and for the raised printed image to be printed in an ink having predetermined chroma and lightness.

It has now been determined that different effects can be achieved, while maintaining the same or better security, by changing the nature of the ink for producing the raised printed image.

SUMMARY OF THE INVENTION

The invention provides a security document or other device including a substrate, a smooth highly reflective layer applied to said substrate and having a reflectivity of at least 60 gloss units and a raised printed image applied to said reflective layer by a printing process, at least part of said raised printed image having a height of at least 10 $\mu$m, said printed image being printed using ink having properties which render it substantially transparent or translucent while causing scattering of the light reflectance and transmittance in at least a partially specular manner.

By printing an image using substantially transparent or translucent ink on the reflective layer or patch, a slightly specular scattering of the light is caused by the translucent intaglio ink when the document is viewed within the window of high reflection, which, is of a high contrast to the relatively coherent reflections from the substrate. This contrast causes the image produced by the printed translucent intaglio ink to be very visible.

In a preferred form of the invention, the translucent ink has a haze value range of about 60 to 98, and more preferably about 85 to 95 as measured on an electro-optical haze measuring instrument such as the XL 211Hazegard™system manufactured by Gardener Laboratories Inc of Bethesda, Md., USA at an ink thickness of 15 microns. The appearance of such a 15 micron sample is similar to have copy paper or tracing paper in which light of the entire visible spectrum is able to transmit through the sample but the degree of light scatter is considerable. If the ink is touching an object such as by being printed on it, the underlying object is clearly distinguishable, but if the underlying object is more than about one centimetre away from the object, it is no longer distinguishable.

When the document is viewed from outside the window of high reflection, the substrate below the translucent intaglio ink has a dull appearance. This dull appearance does not have a contrasting effect to the slightly specular reflectance and transmittance caused by the translucent ink. As a result, the image of the translucent ink is essentially invisible.

The invention also provides a method of producing a security document or other device, including the steps of applying a smooth highly reflective layer to a substrate, said reflective layer having a reflectivity of at least 60 gloss units, and printing a raised printed image on the reflective layer, at least part of said raised printed having a height of at least 10 $\mu$m and being printed using ink having properties which render it substantially transparent or translucent while causing scattering of the light reflectance and transmittance in at least a partially specular manner.

The smooth highly reflective layer can be applied by printing as part of the gravure printing process used to print security documents and devices, such as banknotes. If desired, other printing processes, such as silk screen printing, may be used to apply the layer. Alternatively, a layer having the required reflectivity can be achieved by hot stamping of foil having the required reflectivity to the substrate.

Where the smooth highly reflective layer is applied by a printing process, it is applied in a manner which achieves a layer thickness of about 3 $\mu$m.

The layer can be restricted to a relatively small region or patch of the substrate defining the security document or other device to thereby define a specific security feature in the document or device. Alternatively, the layer can be applied to larger areas of the substrate, including the whole substrate.

The substrate is preferably a smooth substrate such as a laminated polymer material of the type used in the production of Australian banknotes, and manufactured and sold by the applicant under the trade mark GUARDIAN, or any other smooth surfaced polymer suitable for use in the production of security documents or devices. Although paper substrates are not as smooth as polymer substrates, acceptable results can be achieved by printing or laminating a reflective patch onto a paper substrate, which is then calendared by the subsequent intaglio printing process.

Where the smooth highly reflective layer is applied by printing, the ink used should incorporate selected pigments and binders which will enable the cured reflective surface to withstand chemical and physical attack over an extended period of time, comparable to the expected life of the document.

The printed image is preferably applied by intaglio printing, or although other known printing processes capable of producing raised lines or dots on the reflective layer may be used. Intaglio printing can produce superior tonal effects by altering line widths and/or dot dimensions as in the other printing process, as well as by altering the height of the print. The height component of the intaglio printing can be used well for this feature to enhance the partial specular reflection and transmittance of light caused by the translucent ink, thus enhancing the contrasting image viewed in the window of high reflection. The printed image will typically have an average height of about 10 μm to 100 μm, which is about the upper limit of the height which can be achieved using the intaglio printing process.

The intaglio ink used for printing the image should be substantially transparent or translucent such that it is able to scatter the light reflectance and transmittance in at least a partially specular manner.

An interesting and marketable variation on this invention is created if the reflective substrate bears non-reflective indicia. Using this arrangement, the contrast caused by the slightly specular reflection and transmittance when the document is viewed in the window of high reflection, causes the indicia to blur and become unrecognisable.

Therefore:

when the document is viewed in the window of high reflection the image produced by the translucent intaglio ink is the visible image;

when the document is viewed outside the angle of high reflection the image produced by the non-reflective indicia on the reflective substrate is the visible image.

For the translucent ink to optimally blur the non-reflective indicia, the pitch of the intaglio lines or dots can vary from roughly twice that of the indicia (1:2) to the ratio illustrated in FIG. 3 (approximately 1:5).

BRIEF DESCRIPTION OF THE DRAWINGS

A preferred embodiment of the invention will now be described with reference to the accompanying drawings in which.

DESCRIPTION OF THE PREFERRED EMBODIMENTS

Figure 1:
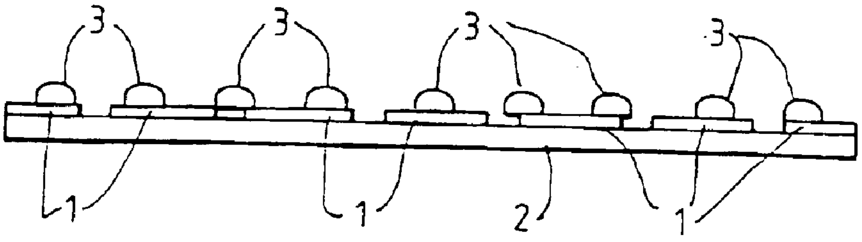
FIGS. 1 is a schematic illustration of a document embodying the invention.

As illustrated in FIG. 1, reflective metallic ink patches 1 are printed by the gravure printing process onto a smooth polymer substrate 2, such as any one of the substrates currently used in the production of polymer banknotes in Australia and overseas, for example "Guardian" substrate, and a printed image 3 is applied to the patches 1 by intaglio printing. The following preferred ink formulations and gravure engraving specifications will produce acceptable results in the reflective patches 1.

To achieve the required highly reflective surface, the following inter formulations and gravure engraving specifications can be used:

Silver colored reflective patch,

| | | |
|---|---|---|
| Eckart Aluminium (PCA)-18% | Syloid | 308-0.5–1.0% |
| Resin (two pack polyurethane system)-35% | Catalyst-5.3% | |
| MIBK-3% | | |

Add Ethyl Acetate to achieve a printing viscosity of 21–23 secs. using Zahn cup No. 2

Gold coloured reflective patch,

Eckart Gold (Rotoflex, Resist Grade Rich Pale Gold)-31%

| | |
|---|---|
| Resin (two pack polyurethane system)-29% | MIBK-3% |
| Syloid 308-0.5–1.0% | Catalyst-4.4% |

Add Ethyl Acetate to achieve a printing viscosity of 21–23 secs. using Zahn cup No. 2

The gravure cylinder configuration used for these formulations is:

| | |
|---|---|
| Wall = 10 μm | Width = 200.1838 μm |
| Channel = 36 μm | Cell Depth = 57.78807 μm |
| Lines/cm = 59 μm | Stylus = 120° |
| Screen = 41.2 μm | |

To measure the specular reflectance, in percent ($R_s$), of these metallic surfaces, the following equation can be used:

$$R_S(\text{percent}) = 50\left[\left[\frac{\cos i - \sqrt{n^2 - \sin^2 i}}{\cos i + \sqrt{n^2 - \sin^2 i}}\right]^2 + \left[\frac{n^2\cos i - \sqrt{n^2 - \sin^2 i}}{n^2\cos i + \sqrt{n^2 - \sin^2 i}}\right]^2\right]$$

where:

$i$ = the specular (incidence) angle, and $n$ = the index of refraction of the surface.

This formula can be found in ASTM Standard D 2457- 97, Standard Test Method for Specular Gloss of Plastic Films and Solid Plastics A suitable instrument for reasoning specular reflectance is the Micro-Tri-Gloss Meter which uses the above methodology to measure gloss units. The results are related to a highly polished black surface with a refractive index of 1.567.

Below are typical measurements for different substrates measured at a 45° angle:

| | |
|---|---|
| Matt white paper - = | 5.4 |
| Opacified "Guardian" substrate = | 10.1 |
| Metallic Silver ink (on paper) = | 20.4 |
| Silver on Opacified "Guardian substrate ™" = | 102.3 |

Note: At a 45° angle, a perfect mirror measures 1000.

With Matt white paper, the light is reflected in the direction of specular reflection as well as other directions. The capacity of a surface to reflect a light source is therefore significantly reduced. With opacified substrate, the surface is flatter and smoother, however the light source is still reflected specularly. The metallic ink on paper is better but the rougher surface of the paper still affects the reflective properties of the ink. On the other hand, the metallic ink on opacified "Guardian" substrate is more reflective. The intensity of the reflected light is dependent on the angle of illumination and material properties.

The printed image 3 is applied to the reflective patches 1 by means of the intaglio printing process using an ink having transparent or translucent properties, as explained above.

The transparent intaglio ink has the following different properties to other standard intaglio inks:

Higher resin content (about 40–55% wt)

No pigments for clear translucent

Reduced pigments for coloured translucent(<2% wt)

No opacifying agents

Use of transparent filler (such as commercially available "Transpafill" and "Aerosils"), with a high loading (about 20–30% wt).

The ink has similar loadings of solvents, driers and waxes as other standard intaglio inks.

The intaglio printing is applied to the patches 1 to form indicia or other desired images 3.

Figure 2:
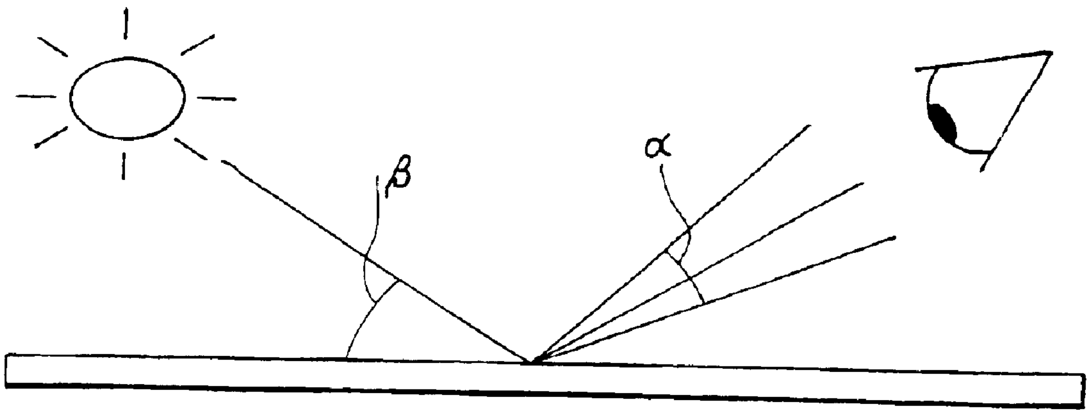
FIG. 2 illustrates the optical properties of the reflective layer absent the printed image.

A plain reflective patch 1 without a printed image experiences two modes of viewing in the presence of a singular light source. When the viewing angle of the document is equal to the angle of incidence of the light point source, the reflective patch 1 appears highly reflective, with minimal light scatter. If the viewing angle is outside the angle of incidence β of the light source (with a buffer of about 15°), the patch 1 appears relatively dull. The viewing angles of high reflection α are referred to as the window of high reflection as illustrated in FIG. 2.

Figure 3:
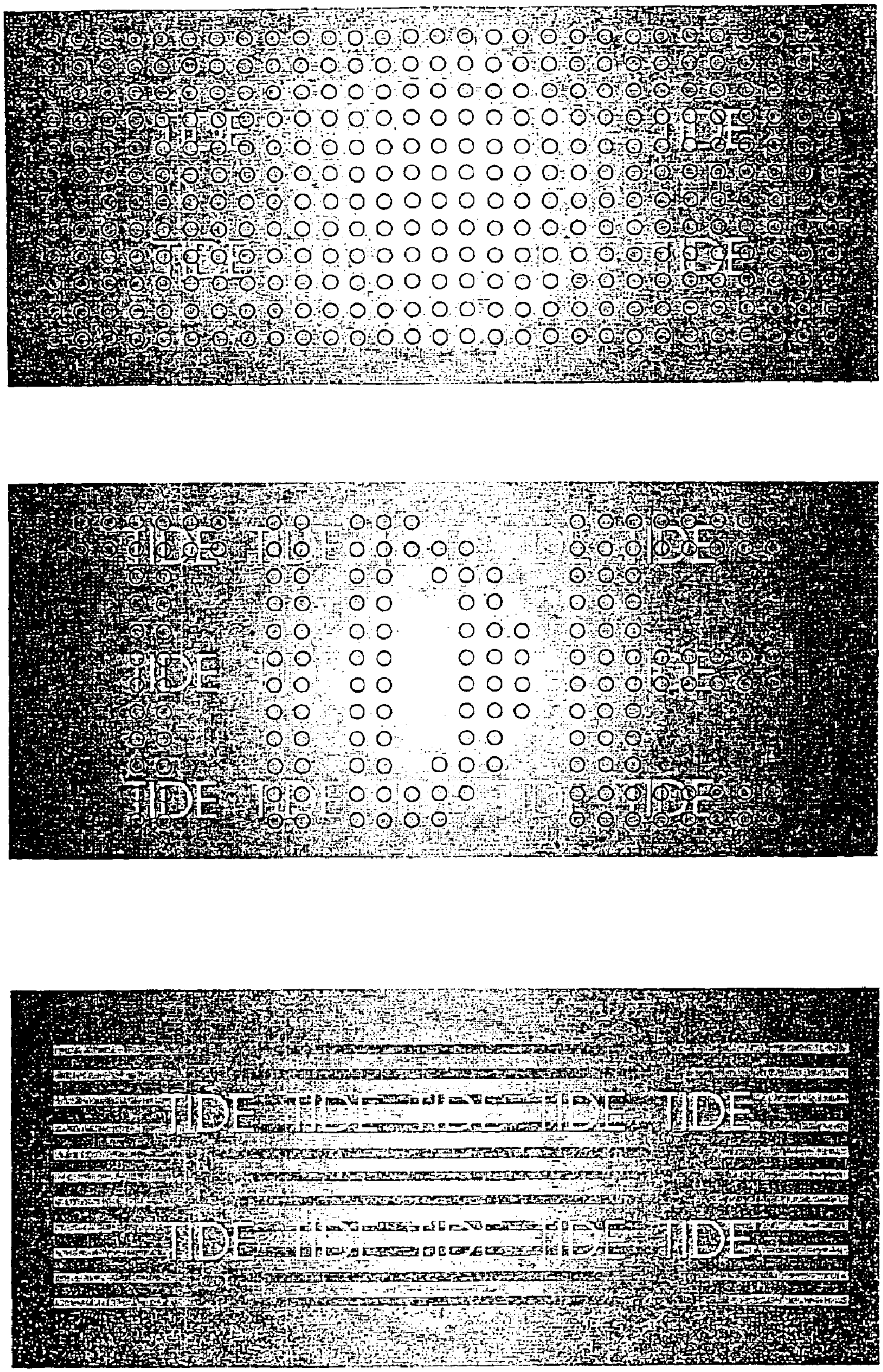
FIG. 3 illustrates a document to which the invention has been applied in which the repeated word TIDE is shown in hidden by dots (a) and (b) and lines (c).

By printing an image 3 of dots (FIGS. 3(*a*) and (*b*)) on lines (FIG. 3(*c*)), using substantially transparent or translucent ink on the reflective layer or patch 1, a slightly specular scattering of the light is caused by the translucent intaglio ink when the document is viewed within the window of high reflection, which is of a high contrast to the relatively coherent reflections from the substrate. This contrast causes the image produced by the printed translucent intaglio ink to be very visible. As shown in FIG. 3, the pitch of the intaglio dots and lines is about half the height of the underlying indicia. The pitch of the dots/lines is about ⅕ of the pitch of the underlying indicia in the exemplary embodiments of the invention shown in FIG. 3.

When the document is viewed from outside the window of high reflection, the substrate below the translucent intaglio ink has a dull appearance. This dull appearance does not have a contrasting effect to the slightly specular reflectance and transmittance caused by the translucent ink. As a result, the image of the translucent ink is essentially invisible. In this way the described management provides a useful security feature which does not require special equipment or expertise for use.

What is claimed is:

1. A method of producing an article comprising the steps of applying a smooth highly reflective layer to a substrate, said reflective layer having a reflectivity of at least 60 gloss units, and printing a raised printed image on the reflective layer, at least part of said raised printed image having a height of at least 10 $\mu$m and being printed using a transparent or translucent ink having properties which render the raised printed image substantially transparent or translucent while causing scattering of the light reflectance and transmittance such that the ink reflects light in at least a partially specular manner, wherein the raised printed image is visible at angles within a window of high reflection and substantially non-detectable outside the window, and the ink has a haze value of about 60 to 98.

2. The method of claim 1, wherein the ink has an ink thickness of about 15 microns.

3. The method of claim 1, wherein the haze value is about 85 to 95 as measured on an XL 211 Hazegard haze measuring instrument.

4. The method of claim 1, wherein the smooth highly reflective layer is applied by a printing process.

5. The method of claim 4, wherein the smooth highly reflective layer is applied to a specific region of the substrate and the method further comprises printing a remaining portion of the substrate by the same printing process as used to print the smooth highly reflective layer.

6. The method of claim 4, wherein the reflective layer is 3 microns thick.

7. The method of claim 1, wherein the smooth highly reflective layer is reflective foil applied to the substrate.

8. The method of claim 4, wherein the substrate is a smooth surfaced polymer film.

9. The method of claim 1, wherein the raised printed image is a pattern of raised dots.

10. The method of claim 9, wherein the pattern of raised dots is a regular array of spaced dots.

11. The method of claim 10, wherein the reflective substrate bears non-reflective indicia.

12. The method of claim 11, wherein the ratio of the pitch of the dots to the pitch of the indicia is in the range of about 1:5 to about 1:2.

13. The method of claim 1, wherein the raised printed image is a pattern of lines.

14. The method of claim 13, wherein the pattern of lines is a series of regularly spaced substantially parallel lines.

15. The method of claim 14, wherein the reflective substrate bears non-reflective indicia.

16. The method of claim 15, wherein the ratio of the pitch of the lines to the pitch of the indicia is in the range of about 1:5 to about 1:2.

17. The method claimed in claim 1, wherein the article is selected from the group consisting of passports, bonds, banknotes, security passes and security devices.

18. An article comprising a substrate, a smooth highly reflective layer applied to said substrate and having a reflectivity of at least 60 gloss units, and a raised print image on said reflective layer, at least part of said raised print image having a height of at least 10 microns, said raised print image formed by a transparent or translucent ink having properties which render the raised print image transparent or translucent while causing scattering of the light reflectance and transmittance such that the ink reflects light in a partially specular manner, wherein the raised print image is visible at angles within a window of high reflection and substantially non-detectable outside the window, wherein the transparent or translucent ink contains less than 2% pigment by weight.

19. An article as claimed in claim 18, wherein the ink has a haze value in the range of about 60 to 98, as measured on an XL 211 Hazegard haze measuring instrument and an ink thickness of about 15 microns.

20. An article as claimed in claim 19 wherein the haze value is about 85 to 95.

21. An article as claimed in claim 18 wherein the smooth highly reflective layer is a print layer.

22. An article as claimed in claim 21, wherein the smooth highly reflective layer is applied to a specific region of the substrate and a remaining portion of the substrate has printing applied by the same process as the smooth highly reflective layer.

23. An article as claimed in claim 18, wherein the reflective layer is about 3 microns thick.

24. An article as claimed in claim 18, wherein the smooth highly reflective layer comprises a reflective foil applied to the substrate.

25. An article as claimed in claim 18 wherein the substrate is a smooth surfaced polymer film.

26. An article as claimed in claim 18, wherein the transparent or translucent ink contains less than 2% pigment by weight.

27. An article as claimed in claim 18, wherein the raised printed image is a pattern of raised dots.

28. An article as claimed in claim 27, wherein the pattern of raised dots is a regular array of spaced dots.

29. An article as claimed in claim 28, wherein the reflective substrate bears non-reflective indicia.

30. An article as claimed in claim 29, wherein the ratio of the pitch of the dots to the pitch of the indicia is in the range of about 1:5 to about 1:2.

31. An article as claimed in claim 18, wherein the raised printed image is a pattern of lines.

32. An article as claimed in claim 31, wherein the pattern of lines is a series of regularly spaced substantially parallel lines.

33. An article as claimed in claim 32 wherein the reflective substrate bears non-reflective indicia.

34. An article as claimed in claim 33, wherein the ratio of the pitch of-the lines to the pitch of the indicia is in the range of about 1:5 to about 1:2.

35. An article as claimed in claim 18, wherein the article is selected from, the group consisting of passports, bonds, banknotes, security passes and security devices.

36. An article comprising a substrate, a smooth highly reflective layer applied to said substrate and having a reflectivity of at least 60 gloss units, and a raised print image on said reflective layer, at least part of said raised print image having a height of at least 10 microns, said raised print image formed by transparent or translucent ink having properties which render the raised print image transparent or translucent while causing scattering of the light reflectance and transmittance such that the ink reflects light in a partially specular manner, wherein the raised print image is visible at angles within a window of high reflection and substantially non-detectable outside the window, wherein the ink has a haze value in the range of about 60 to 98.

37. An article as claimed in claim 36, wherein the ink has an ink thickness of about 15 microns.

38. An article as claimed in claim 36, wherein the haze value is about 85–95 as measured on an XL 211 Hazegard haze measuring instrument.

39. An article as claimed in claim 36, wherein the smooth highly reflective layer is a print layer.

40. An article as claimed in claim 39, wherein the smooth highly reflective layer is applied to a specific region of the substrate and a remaining portion of the substrate has printing applied by the same process as the smooth highly reflective layer.

41. An article as claimed in claim 36, wherein the reflective layer is about 3 microns thick.

42. An article as claimed in claim 36, wherein the smooth highly reflective layer comprises a reflective foil applied to the substrate.

43. An article as claimed in claim 36, wherein the substrate is a smooth surfaced polymer film.

44. An article as claimed in claim 36, wherein the ink contains less than 2% pigment by weight.

45. An article as claimed in claim 36, wherein the smooth highly reflective layer is a print layer.

46. An article as claimed in claim 37, wherein the raised print image is a pattern of dots.

47. An article as claimed in claim 38, wherein the pattern of dots is a regular array of spaced dots.

48. An article as claimed in claim 39, wherein the reflective layer bears non-reflective indicia.

49. An article as claimed in claim 48, wherein the ratio of the pitch of the dots to the pitch of the indicia is in the range of about 1:5 to about 1:2.

50. An article as claimed in claim 36, wherein the raised print image is a pattern of lines.

51. An article as claimed in claim 50, wherein the pattern of lines is a series of regularly spaced substantially parallel lines.

52. An article as claimed in claim 51, wherein the reflective layer bears non-reflective indicia.

53. An article as claimed in claim 52, wherein the ratio of the pitch of the lines to the pitch of the indicia is in the range of about 1:5 to about 1:2.

54. An article as claimed in claim 36, wherein the article is selected from the group consisting of passports, bonds, banknotes, security passes, and security devices.

55. A method of producing an article comprising the steps of applying a smooth highly reflective layer to a substrate, said reflective layer having a reflectivity of at least 60 gloss units, and printing a raised printed image on the reflective layer, at least part of said raised printed image having a height of at least 10 $\mu$m and being printed using ink having properties which render it substantially transparent or translucent while causing scattering of the light reflectance and transmittance such that the ink reflects light in at least a partially specular manner, wherein the raised printed image is visible at angles within a window of high reflection and substantially non-detectable outside the window, and wherein the transparent or translucent ink contains less than 2% pigment by weight.

56. The method of claim 55, wherein the ink has a haze value of about 60 to 98 as measured on an XL 211 Hazegard haze measuring instrument and an ink thickness of about 15 microns.

57. The method of claim 55, wherein the haze value is about 85 to 95.

58. The method of claim 55, wherein the smooth highly reflective layer is applied by a printing process.

59. The method of claim 58, wherein the smooth highly reflective layer is applied to a specific region of the substrate and the method further comprises printing a remaining portion of the substrate by the same printing process as used to print the smooth highly reflective layer.

60. The method of claim 58, wherein the reflective layer is about 3 microns thick.

61. The method of claim 55, wherein the smooth highly reflective layer is reflective foil applied to the substrate.

62. The method of claim 55, wherein the substrate is a smooth surfaced polymer film.

63. The method of claim 55, wherein the raised printed image is a pattern of raised dots.

64. The method of claim 63, wherein the pattern of raised dots is a regular array of spaced dots.

65. The method of claim 64, wherein the reflective substrate bears non-reflective indicia.

66. The method of claim 65, wherein the ratio of the pitch of the dots to the pitch of the indicia is in the range of about 1:5 to about 1:2.

67. The method of claim 55, wherein the raised printed image is a pattern of lines.

68. The method of claim 67, wherein the pattern of lines is a series of regularly spaced substantially parallel lines.

69. The method of claim 68, wherein the reflective substrate bears non-reflective indicia.

70. The method of claim 69, wherein the ratio of the pitch of the lines to the pitch of the indicia is in the range of about 1:5 to about 1:2.

71. The method claimed in claim 55, wherein the article is selected from the group consisting of passports, bonds, banknotes, security passes and security devices.

* * * * *